United States Patent [19]
Mitson

[11] Patent Number: 5,445,183
[45] Date of Patent: Aug. 29, 1995

[54] FLUSH TANK TOOL FOR REPLACING A BALLCOCK ASSEMBLY

[76] Inventor: Ken J. Mitson, 40W381 Winchester Way, St. Charles, Ill. 60175

[21] Appl. No.: 300,166

[22] Filed: Sep. 2, 1994

[51] Int. Cl.⁶ ............................................. F16K 43/00
[52] U.S. Cl. .................................. 137/315; 29/221.6; 137/439
[58] Field of Search ................ 137/15, 315, 410, 434, 137/439, 443, 444; 29/213.1, 221.6

[56] References Cited

U.S. PATENT DOCUMENTS

| | | | |
|---|---|---|---|
| 1,879,091 | 9/1932 | Clancy | 137/439 |
| 2,022,430 | 11/1935 | Nold | 137/439 |
| 2,023,284 | 12/1935 | Osborn | 137/439 |
| 2,041,579 | 5/1936 | Tollefsen | 137/439 |
| 2,791,235 | 5/1957 | Smith | 137/444 |
| 2,819,727 | 1/1958 | Levine | 137/444 |
| 3,207,170 | 9/1965 | Fulton | 137/444 |
| 4,258,737 | 3/1981 | Wheeler | 137/15 |
| 4,416,302 | 11/1983 | Schoepe | 137/315 |
| 4,699,169 | 10/1987 | Sherby | 137/444 |
| 4,735,230 | 4/1988 | Detloff | 137/315 |

*Primary Examiner*—George L. Walton
*Attorney, Agent, or Firm*—Lloyd L. Zickert

[57] ABSTRACT

A flush tank tool for replacing a ballcock assembly in the flush tank of a toilet, which is in the form of a tubular member of rubber-like material formed over a metal core and being closed so that insertion of the tool into the ballcock assembly hole at the bottom of a flush tank will plug the hole against loss of residual water in the tank.

21 Claims, 3 Drawing Sheets

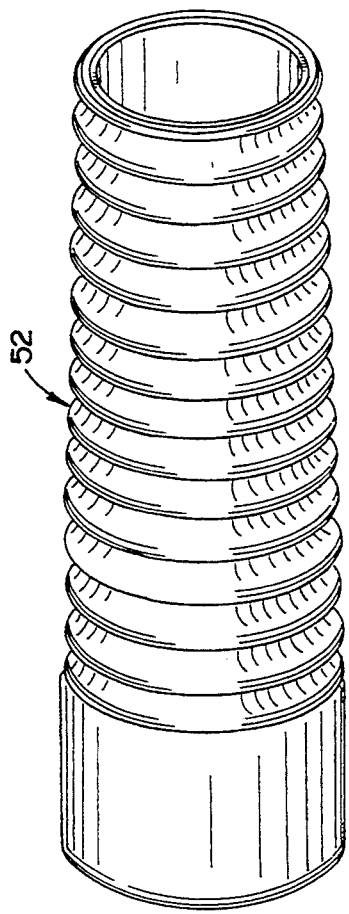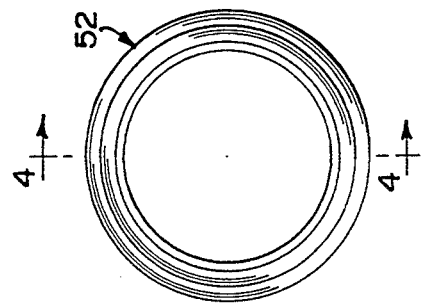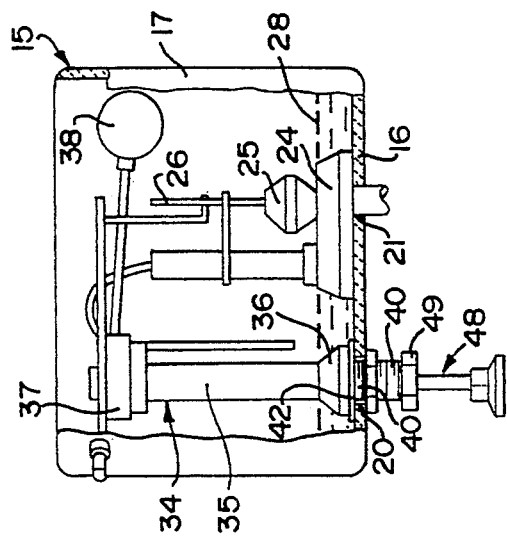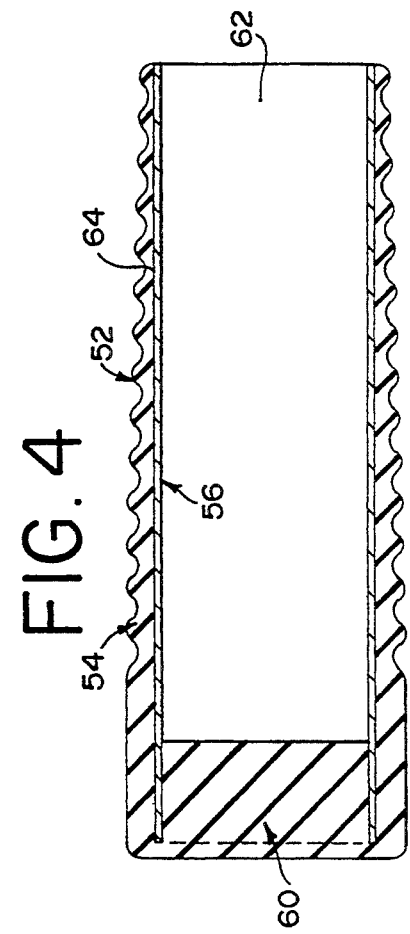

FLUSH TANK TOOL FOR REPLACING A BALLCOCK ASSEMBLY

DESCRIPTION

This invention relates in general to a plumber's tool for use in replacing a ballcock assembly in a toilet flush tank which essentially prevents leakage of residual water at the bottom of the tank during the time that the assembly is being replaced, and more particularly to a flush tank tool functioning as a plug for the ballcock assembly opening in the bottom of a flush tank during replacing of a ballcock assembly to prevent the leakage of residual water in the flush tank.

BACKGROUND OF THE INVENTION

During the replacement of the ballcock assembly in a toilet flush tank for repairing a flush tank, the flush tank is first emptied of the flushing water. Due to the structure of the flush valve assembly which is mounted on the bottom of the tank, residual water remains in the tank after the tank has been emptied of the flushing water. Thus, when the ballcock assembly is removed, the residual water would normally leak from the bottom of the flush tank through the opening where the ballcock assembly is mounted. This results in wetting the floor with considerable water and the necessity to clean up the water after the assembly is replaced.

SUMMARY OF THE INVENTION

The present invention overcomes the leakage of residual water during replacement of the ballcock assembly. The present invention is a tool used during the removal of a ballcock assembly and the subsequent replacement of a new assembly which plugs the hole in the bottom of a flush tank during this removal and replacement procedure and prevents the loss of the residual water at the bottom of the tank. Accordingly, the water leakage over the floor that has heretofore been encountered is avoided, and less time is involved in making the repair.

The tool of the present invention is in the form of a tubular member closed at one end or somewhere along the length of the member. The tubular member is formed by providing a metal core over which rubber is molded in the form of a tapered plug that will fit in and seal the ballcock assembly hole at the bottom of the flush tank. As the ballcock assembly is being removed, the tool is aligned over the threaded shank of the ballcock assembly at the underside of the tank and pushed up into the hole during removal of the ballcock assembly to plug the hole and prevent the loss of residual water at the bottom of the tank. Thereafter, when the new ballcock assembly is to be mounted, coordination between removal of the tool and mounting of the new ballcock assembly again avoids the loss of the residual water in the bottom of the tank.

Another version of the invention is to provide a wrench at one end of the tool capable of fitting on the ballcock assembly nut that securely mounts the ballcock assembly in position on the flush tank to assist in removal of the nut.

It is therefore an object of the present invention to provide a new and improved plumber's tool for facilitating the replacement of ballcock assemblies in toilet flush tanks.

Another object of the present invention is to provide a tool facilitating the replacement of the ballcock assembly in a flush tank and which prevents the loss of residual water at the bottom of the tank during the replacement procedure.

Another object of the invention is to provide a tool for facilitating the replacement of a ballcock assembly in a toilet flush tank which is capable of assisting in the removal of the ballcock assembly mounting nut and also plugging the flush tank hole for the ballcock assembly during the ballcock replacement procedure.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a front elevational view of a typical flush tank for a toilet with parts broken away to show parts within the tank;

FIG. 2 is an enlarged perspective view of the tool according to the present invention;

FIG. 3 is an end elevational view of the tool of FIG. 2 showing the open end of the tool;

FIG. 4 is an axial sectional view taken through the tool of FIG. 3 substantially along line 4—4 of FIG. 3;

FIGS. 5, 6, 7 and 8 are views of the flush tank and illustrating the sequential use of the tool of the present invention wherein:

FIG. 5 illustrates the step of removing the supply connection for the water from the shank of the ballcock assembly, and positioning the tool of the present invention for use;

FIG. 6 illustrates the movement of the tool of the invention over the shank of the ballcock assembly after removal of the shank nut from the assembly and just prior to removal of the ballcock assembly from the flush tank;

FIG. 7 shows the tool of the invention in place plugging the opening for the ballcock assembly shank; and FIG. 8 shows the placement of the new ballcock assembly;

DESCRIPTION OF THE INVENTION

Figure 5:
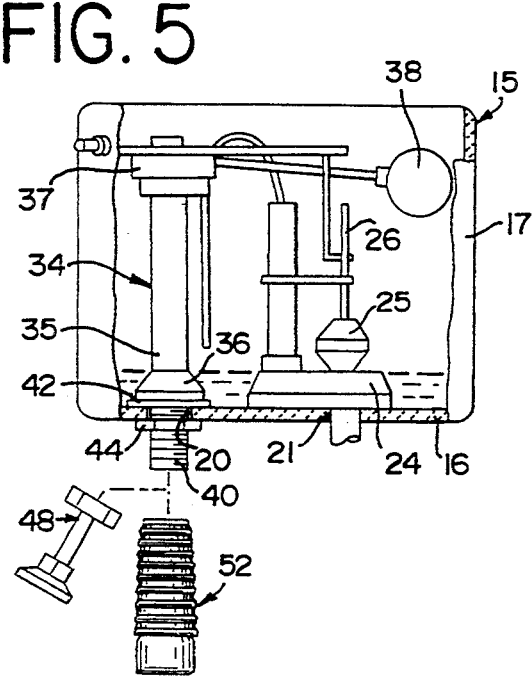

The tool of the present invention is employed to facilitate the replacement of a ballcock assembly in a flush tank to avoid the leakage of residual water from the tank during the replacement procedure. It will be appreciated that when a ballcock assembly is to be replaced in a tank, the water supply is first turned off and the tank is flushed so that the flushing water has been removed. Thereafter, because the flush valve projects above the bottom of the tank a distance that will keep some water in the tank that cannot be flushed out, residual water will be at the bottom of the tank. The depth of this water may be anywhere from one-half inch to one inch in depth, and when a ballcock assembly is removed, this residual water could leak through the opening from where the ballcock shank is removed unless some precaution is taken to prevent that leakage. Heretofore, it has usually leaked out, and attempts have been made to try to catch it with a container or to even let it leak on the floor and later mop it up. However, the present invention is a tool that facilitates the removal of the ballcock assembly and the plugging of the opening during ballcock replacement to prevent the leakage of the residual water. This obviously avoids a water problem on the floor of the room in which the toilet is located.

The tool of the present invention is formed so that as the shank nut is removed from the ballcock assembly, the tool can be positioned at the opening of the shank while the ballcock assembly is held in place to prevent leakage of water and then as the ballcock assembly is removed, the tool can be simultaneously moved into place plugging the opening through which the shank would extend. Thereafter, similar cooperative movement between the replacement ballcock assembly and then the withdrawal of the tool will again prevent the leakage of the residual water in the tank.

Referring now to the drawings, a flush tank of a typical type is illustrated in FIG. 1 and generally designated by the numeral 15. The cover for the flush tank has already been removed so that access can be obtained to the flush tank from the top of the tank. The tank includes a bottom wall 16 and upstanding side walls 17. The bottom wall 16 includes openings 20 and 21. The opening 20 will receive, as described below, the shank of the ballcock assembly, while the opening 21 will receive a drain line from the flush valve, which then goes into the toilet. Because of the usual construction of the flush valve which projects above the bottom of the tank, residual water will remain in the bottom of the tank once the flushing water has been discharged from the tank.

While any type of flush valve may be employed, a typical valve would include, as illustrated, a valve seat 24 and a valve closure member 25 that is suitably connected to linkage 26 that when actuated will raise the valve closure member 25 from its seat and allow the flushing water to be discharged from the tank. If the water supply is turned off and the flush valve is actuated to discharge the flushing water, the tank will have a supply of residual water at the bottom of the tank having a level approximately that indicated by the numeral 28. It is this residual water that can leak out when a ballcock assembly is replaced inasmuch as when the ballcock assembly is removed, the opening for the shank of the ballcock assembly will allow leakage of this residual water.

The ballcock assembly illustrated is generally designated by the numeral 34 and includes a vertically extending tubular member 35 within the tank flanged at the lower end at 36. At the upper end of the tubular member a water valve 37 controlled by a float 38 controls the level of the water in the tank between flushing cycles. Extending from the flange 36 is the ballcock shank 40 seen more clearly in FIGS. 5 and 7 which is threaded such that when in place it can be sealingly secured to the bottom wall 16 of the tank. In order to seal the shank at the bottom of the tank, a sealing gasket 42 is provided within the tank encircling the shank and positioned between the flange 36 and the bottom wall 16. A shank nut 44 then is threadedly received on the shank and tightened against the bottom of the tank which draws the sealing gasket 42 down in sealed relation by virtue of the force of the flange 36 to seal the ballcock assembly to the bottom of the tank against the leakage of water around the shank 40. It will be appreciated that a water supply 48 having a coupling nut 49 will be connected in sealing relationship to the ballcock shank 40 and, of course, connected to a suitable supply of water. A valve will be provided in this connection so that for maintenance purposes the supply of water to the flush tank can be selectively turned off.

The tool of the present invention, which facilitates the placement of a ballcock assembly, is generally illustrated in FIGS. 2 to 4 and designated by the numeral 52. The tool includes a tubular body 54 of resilient material molded over a tubular stiffening core or member 56. The tool 52 is provided with a plug 60 at one end and is open at the other end at 62. While the body 54 may be made of any suitable resilient material, it is preferably made of a suitable rubber that may be natural or synthetic. It also could be made of a resilient plastic having good memory characteristics. While the core 56 may be made of any suitable stiff material, it is preferably made of metal, although it could be made of a rigid plastic.

The tubular body 54 is preferably tapered at the outer side toward the open end 62 from a suitable point at the opposite end of the tool and provided with a plurality of axially spaced apart ribs or rings 64 that coact with the taper along the outer periphery of the rings for providing a seal with the opening 20 in the bottom of the flush tank when the tool is thrust into the opening to suitably plug the hole against leakage around the periphery of the tool. It will be appreciated that the tool will be sized so that the core 56 will easily slip over the ballcock assembly shank 40 and so the resilient body 54 will fit in the opening 20 at the bottom wall of the flush tank and lock in place by the action of the rubber body and the ribs 64. As the tool is thrust into the opening the taper along the exterior of the plugging portion of the tool is such as to accommodate openings of various sizes within the parameters of the taper so that it will work on all ballcock openings. Inasmuch as the ballcock assembly shank has an exterior diameter of normally 15/16 of an inch or 0.9375 inches, the metal core 56 may be a one-inch tubing where the outer diameter is equal to one inch and the inner diameter is slightly less than one inch but large enough to slip over the threaded shank of the ballcock assembly.

Figure 6:
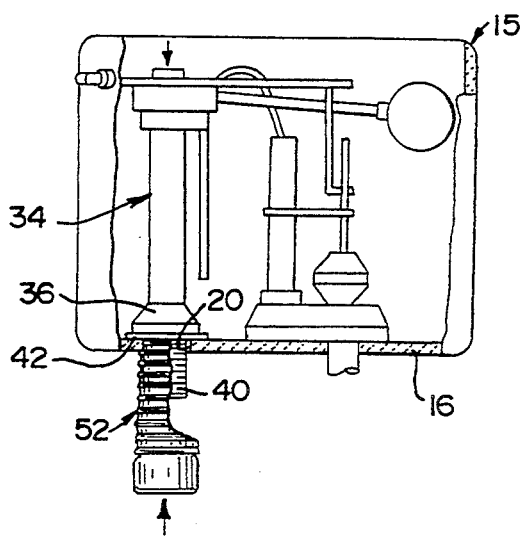
Figure 7:
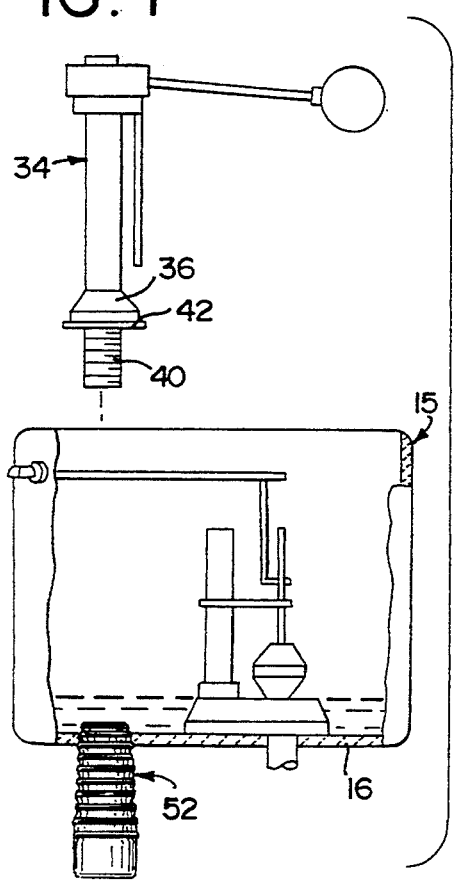
Figure 8:
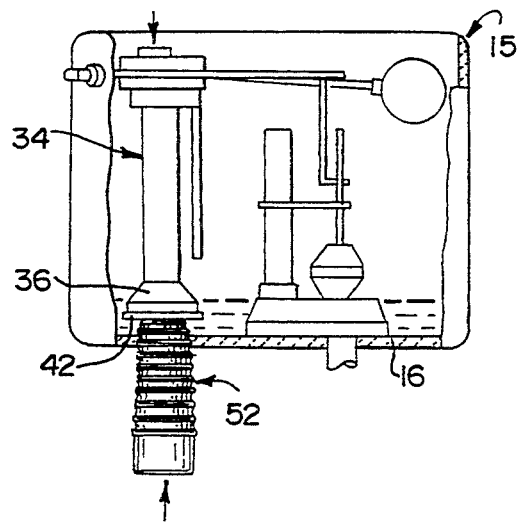

The procedure for replacing a ballcock valve assembly includes turning off the supply of water coming into the flush tank and through the water supply connector 48. The flush valve is operated to empty the tank of the flushing water, thereby leaving the residual water in the tank at about the level 28. Next, the water supply connector 48 is removed from the ballcock assembly shank 40. Thereafter, the ballcock shank nut 44 is unscrewed from the ballcock shank and removed. During nut removal, a downward force is applied to the top of the ballcock assembly as indicated by the arrow 66 in FIG. 5 to maintain the sealing gasket 42 in sealing relation with the bottom of the tank and the flange 36 of the ballcock assembly, in order to prevent the leakage of the residual water in the tank. When the water connection is removed, a small amount of water will be leaked through the ballcock assembly, which can be easily handled by use of a rag or sponge. With pressure being applied to the top of the ballcock valve assembly, the plug tool 52 of the invention is moved into place, as seen in FIG. 6, where the open end of the tool slips over the end of the ballcock valve shank and the tip end of the resilient body engages the outlet opening 20. Then an upward force is applied to the plug tool as indicated by the arrow 67, and at the same time a corresponding release of force of the downward force 66 against the ballcock valve assembly so that as the ballcock valve assembly is lifted upwardly, the plug tool 52 moves upwardly until it fully engages into a sealing relation with the opening 20 in the bottom of the tank, as shown in FIG. 7. Because of the ribs on the plug tool 67, the plug tool will remain in place inasmuch as it is wedged into a sealing relation with the opening 20. Thereafter, a replacement ballcock assembly is brought into position, as shown in FIG. 8, in order to engage the plug tool and where the shank is received within the tool, and as a downward force is applied to a ballcock valve, a like release of force against the plug tool and a withdrawal of the tool from the opening will allow the ballcock valve assembly to come into sealing relation with the bottom of the tank. Thereafter, the nut 44 is applied to the shank of the ballcock 40 and tightened so that the seal 42 is pressed into sealing relation between the flange 36 and the bottom wall 16 of the tank to seal around the ballcock shank 40 against water leakage. Thus, the assembly or replacement of the ballcock valve assembly has been achieved without leakage of the residual water in the bottom of the tank. The shank nut is tightened while holding the ballcock valve assembly in sealing relation, and thereafter the water connection may be hooked up to the ballcock valve assembly shank and the water supply turned on again in order to put the flush tank back into operation.

Figure 9:
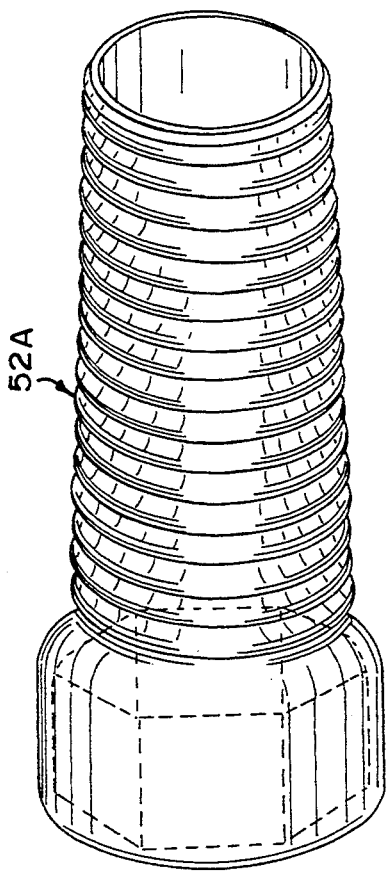
FIG. 9 is a perspective view of a modification of the invention wherein the tool includes a socket wrench at one end.
Figure 11:
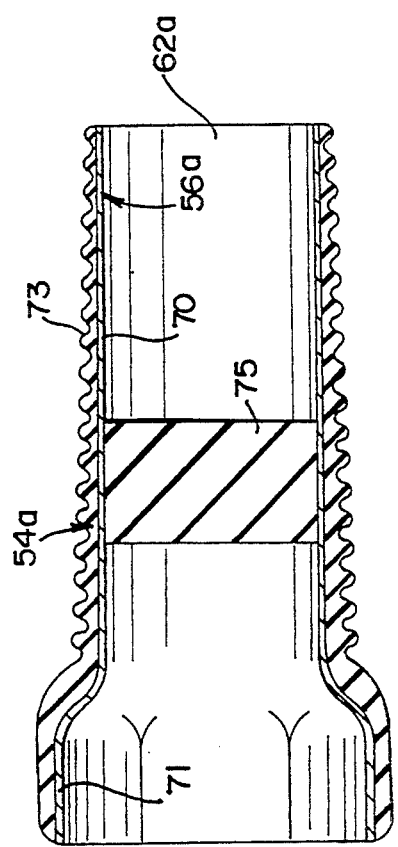
FIG. 11 is an axial sectional view taken through the tool of FIGS. 9 and 10 substantially along line 11—11 of FIG. 10.
Figure 10:
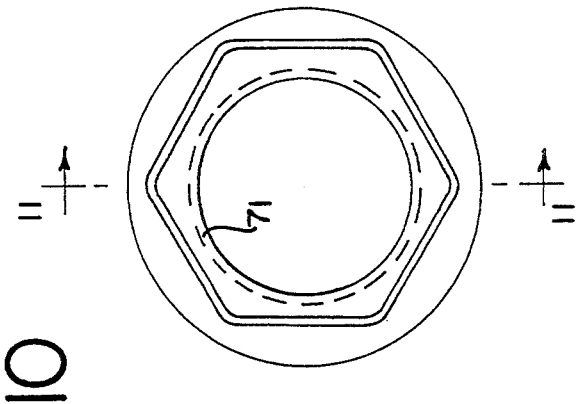
FIG. 10 is an end elevational view showing the socket wrench end of the tool of FIG. 9.

A further embodiment of the plumber's tool of the present invention is illustrated in FIGS. 9 to 11, which differs from the embodiment of FIGS. 2 to 4 only in that the end opposite the open end includes a socket wrench for use in removing the shank nut from the ballcock assembly shank, thus facilitating the entire replacement procedure. Further, the plug is disposed in spaced relation from both ends intermediate the stiffening core. Referring now to FIGS. 9 to 11, this embodiment is generally indicated to be 52A and includes an outer resilient body 54a and an inner stiffening core 56a.

The stiffening core 56a is preferably made of metal like the first embodiment and includes a first section 70 that is tubular and of a constant dimension throughout and a second section 71 which is in the form of a wrench socket sized to be able to fit over a shank nut on a ballcock assembly. Therefore, the socket is hexagonally shaped, as particularly seen in FIG. 10. Preferably, the wrench socket end is formed integral with the metal core 70 so that a one-piece core structure is provided for the tool. The resilient body 54a is again tapered from the open end 62a to the section 71 where the wrench socket is provided. Further, the resilient body includes a plurality of annular ribs or rings 73 as in the first embodiment.

Inasmuch as the end of the tool opposite the open end 62a is provided with the socket wrench 71, a plug is thereafter mounted intermediate the ends of the stiffening core and is designated 75. Thus, after the resilient body is molded onto the core, a plug of suitable material, and preferably rubber, is press-fit within the stiffening core 56a in any suitable manner in order to provide the plug for the tool and to prevent the leakage of water through the center of the tool when it is used in connection with plugging the opening in the bottom of a flush tank.

Except for the use of this embodiment 52A to additionally serve to unscrew shank nut at the end of the ballcock assembly on the ballcock shank, this tool is otherwise used in the same manner as the first tool whereby it will serve to plug the opening 20 in the bottom of the flush tank during the time the ballcock assembly is removed and replaced with a new or reconditioned ballcock assembly.

It may be appreciated from the foregoing that the new and improved plumber's tool facilitates replacement of a ballcock assembly while at the same time eliminating leakage of the residual water in the bottom of a flush tank in order to prevent the water from going to the floor and needing to be cleaned up at a later time. The tool is very easy to use and makes the job of replacing the ballcock assembly more pleasant and more efficient.

It will be understood that modifications and variations may be effected without departing from the scope of the novel concepts of the present invention, but it is understood that this application is to be limited only by the scope of the appended claims.

The invention is hereby claimed as follows:

1. A tool for facilitating the replacement of a ballcock assembly in the flush tank of a toilet and preventing the leakage of residual water, wherein the tank includes a bottom wall, upstanding side walls and two spaced apart openings in the bottom wall, a flush valve at the bottom of the tank mounted at one of said openings, a ballcock assembly mounted in the tank at the other opening and having an inlet shank extending through said other opening and being sealingly secured to the bottom wall by a shank nut and sealing members, said tool comprising an elongated tubular body of resilient material, a tubular stiffening core of rigid material within said body to prevent collapse of said body when it is in sealing engagement with the shank opening, and a plug within the core to seal against the passage of water therethrough, said core being sized to fit over the shank of the ballcock assembly after the shank nut has been removed, and said resilient body sized to sealingly engage the opening through which the shank extends to plug the opening and prevent leakage of water from the tank when the ballcock assembly is removed, whereby insertion of said resilient body of the tool to engage the opening is coordinated with the removal of the ballcock assembly from said tank and said tool is removed upon the coordinated replacement of either one of a repaired and a new ballcock assembly after which the shank nut is placed on the shank to sealingly assemble either one of the repaired and the new ballcock assembly to the flush tank.

2. The tool as defined in claim 1, wherein said body is tapered on the outer periphery to facilitate sealing engagement with said shank opening.

3. The tool as defined in claim 2, wherein the periphery of said body includes a plurality of spaced apart annular ridges to further facilitate a sealing fit with said shank opening.

4. The tool as defined in claim 1, wherein the tubular stiffening core is metal.

5. The tool as defined in claim 1, wherein the tubular stiffening core is a rigid plastic.

6. The tool as defined in claim 1, which further includes a socket wrench on one end that fits the shank nut to facilitate removal of the shank nut.

7. The tool as defined in claim 6, wherein the plug is intermediate the ends of the tool.

8. The tool as defined in claim 1, wherein the body is of an elastomeric material.

9. The tool as defined in claim 1, wherein the material is rubber.

10. The tool as defined in claim 1, wherein the material is plastic.

11. A plumber's tool for use in replacing a ballcock assembly in a flush tank of a toilet and prevent the leakage of residual water therefrom, wherein the tank includes a bottom wall, upstanding side walls and holes in the bottom wall for receiving a flush valve assembly and a nut-receiving shank of a ballcock assembly, said tool comprising a tubular body of resilient material, a tubular metal core within the body, said metal core having a cavity at one end thereof sized to fit over said shank after the shank nut has been removed, and means plugging the core at a location below the cavity to prevent the leakage of residual water through the core, said resilient body sized to sealingly engage the hole through which the ballcock shank extends when the shank is received within the cavity to prevent the leakage of residual water from the tank when the ballcock assembly is removed from the tank.

12. The tool of claim 11, wherein said plugging means includes a plug at one end integrally molded with the body.

13. The tool of claim 11, wherein said plugging means includes a plug disposed intermediate the ends of the core.

14. The tool of claim 13, wherein a wrench socket is provided at one end of the tool.

15. The tool of claim 14, wherein the outer periphery of the body is tapered.

16. The tool of claim 15, wherein the outer body further includes a plurality of annular ribs.

17. The tool of claim 11, wherein the core is uniformly dimensioned along its length.

18. The tool of claim 11, wherein the outer periphery of the body is tapered along its length.

19. The tool of claim 18, wherein the core is uniformly dimensioned along its length.

20. The tool of claim 18, wherein the tubular body further includes a plurality of annular ribs.

21. The tool of claim 19, wherein the outer body further includes a plurality of annular ribs.

* * * * *